US011617364B2

(12) United States Patent
Zhao et al.

(10) Patent No.: US 11,617,364 B2
(45) Date of Patent: Apr. 4, 2023

(54) MULTI-ORGAN REPAIRING AND TRANSFERRING DEVICE WITHOUT INTERRUPTING BLOOD FLOW

(71) Applicant: THE FIRST AFFILIATED HOSPITAL, SUN YAT-SEN UNIVERSITY, Guangdong (CN)

(72) Inventors: Qiang Zhao, Guangdong (CN); Jinbo Huang, Guangdong (CN); Yefu Li, Guangdong (CN); Honghui Chen, Guangdong (CN); Tao Zhang, Guangdong (CN); Qingwei Nian, Guangdong (CN); Zhiyong Guo, Guangdong (CN); Xiaoshun He, Guangdong (CN)

(73) Assignee: THE FIRST AFFILIATED HOSPITAL, SUN YAT-SEN UNIVERSITY, Guangzhou (CN)

( * ) Notice: Subject to any disclaimer, the term of this patent is extended or adjusted under 35 U.S.C. 154(b) by 0 days.

(21) Appl. No.: 17/878,508

(22) Filed: Aug. 1, 2022

(65) Prior Publication Data

US 2023/0067043 A1 Mar. 2, 2023

(30) Foreign Application Priority Data

Aug. 25, 2021 (CN) .......................... 202110983139.2

(51) Int. Cl.
*A01N 1/02* (2006.01)
(52) U.S. Cl.
CPC .................................. *A01N 1/0247* (2013.01)

(58) Field of Classification Search
None
See application file for complete search history.

(56) References Cited

U.S. PATENT DOCUMENTS 3,406,531 A * 10/1968 Emils ...................... F25D 17/02
62/375
3,877,843 A * 4/1975 Fischel ............... A61M 60/851
91/39
(Continued)

FOREIGN PATENT DOCUMENTS

CN 106508890 A * 3/2017 ............... A01N 1/02
CN 107114358 A 9/2017
(Continued)

*Primary Examiner* — William H. Beisner
(74) *Attorney, Agent, or Firm* — D'Ambrosio & Menon, PLLC; Usha Menon (57) ABSTRACT

A multi-organ repairing and transferring device without interrupting a blood flow includes a first perfusion bin, a second perfusion bin and a third perfusion bin which are configured for storing respective organs. A first pump is arranged on a first pipeline, two ends of the first pipeline are connected with the first perfusion bin and the second perfusion bin respectively, a second pump is arranged on a second pipeline, two ends of the second pipeline are connected with the first perfusion bin and the second perfusion bin respectively, a third pump is arranged on a third pipeline, two ends of the third pipeline are connected with the first perfusion bin and the third perfusion bin respectively, and a fourth pump is arranged on a fourth pipeline, two ends of the fourth pipeline are connected with the first perfusion bin and the third perfusion bin respectively.

8 Claims, 6 Drawing Sheets

(56) References Cited

U.S. PATENT DOCUMENTS

| | | |
|---|---|---|
| 5,338,662 A | 8/1994 | Sadri |
| 2008/0286746 A1 | 11/2008 | Poo |
| 2014/0220550 A1 | 8/2014 | van der Plaats |
| 2017/0339945 A1 | 11/2017 | Freed |

FOREIGN PATENT DOCUMENTS

| | | | | |
|---|---|---|---|---|
| CN | 108157352 A | * | 6/2018 | ........... A01N 1/0247 |
| CN | 109362710 A | | 2/2019 | |
| CN | 109511649 A | | 3/2019 | |
| CN | 111165471 A | | 5/2020 | |
| CN | 213344108 U | | 6/2021 | |
| DE | 1407337 A1 | | 9/1995 | |
| DE | 212017000016 U1 | | 2/2018 | |
| EP | 3430902 A1 | | 1/2019 | |
| WO | 2018076567 A1 | | 3/2018 | |

\* cited by examiner

MULTI-ORGAN REPAIRING AND TRANSFERRING DEVICE WITHOUT INTERRUPTING BLOOD FLOW

CROSS-REFERENCE TO RELATED APPLICATION

This application is based on and claims the benefit of priority from Chinese Patent Application No. 202110983139.2, filed on Aug. 25, 2021, the entirety of which is incorporated by reference herein.

TECHNICAL FIELD

The disclosure relates to the technical field of medical instruments, and more particularly, to a multi-organ repairing and transferring device without interrupting blood flow.

BACKGROUND

There is serious contradiction between supply and demand of organs: liver and kidney transplantation is the first choice for treatment of end-stage liver and kidney diseases, and the number of patients waiting for the liver and kidney transplantation is increasing year by year in the world, so that a supply and demand ratio of organs is seriously out of balance. The contradiction between supply and demand of organs leads to a high mortality rate of patients waiting for organ transplantation. Therefore, how to expand the number of donated organs has become a key problem to be solved as soon as possible in the field of transplantation. Regarding the problem of organ shortage, the transplantation community has put forward many strategies to solve the problem of organ shortage. The improvement and utilization of a marginal transplant have become one of important research directions.

Utilization rate of the marginal transplant such as DCD needs to be improved urgently: there are two main types of organ transplant donors, wherein one is Donation after Brain Death (DBD) and the other is Donation after Circulatory Death (DCD). For the former, a non-ischemic organ transplantation technology and an organ transplantation device without interrupting blood flow developed by our research team have greatly improved and maintained the quality of a transplant of the Donation after Brain Death, and the utilization rate of the transplant of the Donation after Brain Death has been greatly improved. However, for a transplant of the Donation after Circulatory Death, the quality of an organ is greatly reduced due to blood stasis and ischemia after circulatory failure, so that the transplant is usually regarded as the marginal transplant in clinic and abandoned for transplantation, thus having an extremely low utilization rate.

At present, there is a shortage of protective measures for the marginal transplant: cold preservation is still the most commonly used preservation method of an isolated organ in clinic, but the marginal transplant has poor tolerance to the cold preservation. Studies have shown that, compared with a standard transplant, after the cold preservation of the marginal transplant, a risk of transplantation failure due to primary non-function of the transplant and biliary complications is greatly increased. In addition, the cold preservation means that the isolated transplant will go through long-term ischemia, and an ischemia injury of organ is inevitable. An ischemia-reperfusion injury is the most important factor affecting the prognosis of transplantation, which may lead to primary non-function of the transplant (incidence rate 6%), early dysfunction of the transplant (incidence rate 43.8%), ischemic biliary disease (incidence rate 9%) and post-reperfusion syndrome (incidence rate 53.6%) after an operation, and a one-year survival rate of patients is only 84.6%. At present, patent applications CN202010208526.4, CN201811392862.8, CN201811432911.6 and CN201710447818.1 all disclose a liver perfusion preservation device. However, the patent applications above are all a single liver perfusion system, which does not involve joint preservation and perfusion of multiple organs, and lacks repairing and maintenance functions for isolated organs, especially marginal organs. Meanwhile, the patent applications above do not involve isolated organ transferring without interrupting blood flow.

SUMMARY

The disclosure aims to solve at least one of the technical problems in the prior art. Therefore, the disclosure provides a multi-organ repairing and transferring device without interrupting blood flow capable of jointly repairing multiple organs and improving a vitality of the organs.

A multi-organ repairing and transferring device without interrupting blood flow according to an embodiment of the disclosure comprises:

a first perfusion bin for storing a liver;
a second perfusion bin for storing a first kidney;
a third perfusion bin for storing a second kidney;
a first pipeline and a first pump, wherein the first pump is arranged on the first pipeline, one end of the first pipeline is connected with the first perfusion bin, and the other end of the first pipeline is connected with the second perfusion bin;
a second pipeline and a second pump, wherein the second pump is arranged on the second pipeline, one end of the second pipeline is connected with the first perfusion bin, and the other end of the second pipeline is connected with the second perfusion bin;
a third pipeline and a third pump, wherein the third pump is arranged on the third pipeline, one end of the third pipeline is connected with the first perfusion bin, and the other end of the third pipeline is connected with the third perfusion bin; and
a fourth pipeline and a fourth pump, wherein the fourth pump is arranged on the fourth pipeline, one end of the fourth pipeline is connected with the first perfusion bin, and the other end of the fourth pipeline is connected with the third perfusion bin.

The multi-organ repairing and transferring device without interrupting blood flow according to the embodiment of the disclosure at least has the following beneficial effects. Stability of electrolyte, urea, glucose and other components is maintained through kidneys, liver cells and biliary tracts are prevented from being damaged, and multiple organs can be jointly repaired, so that the multiple organs are closer to a perfusion state in donors, thus further improving vitality of the multiple organs.

According to some embodiments of the disclosure, the multi-organ repairing and transferring device without interrupting blood flow further comprises a fifth pipeline, wherein one end of the fifth pipeline is connected with the first pipeline through one three-way valve, and the other end of the fifth pipeline is connected with the second pipeline through another three-way valve.

According to some embodiments of the disclosure, the multi-organ repairing and transferring device without interrupting blood flow further comprises a sixth pipeline, wherein one end of the sixth pipeline is connected with the first pipeline through one three-way valve, and the other end of the sixth pipeline is connected with the second pipeline through another three-way valve, so that the sixth pipeline and the fifth pipeline are arranged in parallel.

According to some embodiments of the disclosure, the multi-organ repairing and transferring device without interrupting blood flow further comprises a first branch pipe, a second branch pipe, a third branch pipe and a fourth branch pipe, wherein the first pipeline, the second pipeline, the third pipeline and the fourth pipeline are all provided with two three-way valves arranged at an interval, one end of the first branch pipe is connected with one three-way valve of the first pipeline, the other end of the first branch pipe is connected with one three-way valve of the second pipeline, one end of the second branch pipe is connected with the other three-way valve of the first pipeline, and the other end of the second branch pipe is connected with the other three-way valve of the second pipeline, so that the first branch pipe and the second branch pipe are arranged in parallel; and one end of the third branch pipe is connected with one three-way valve of the third pipeline, the other end of the third branch pipe is connected with one three-way valve of the fourth pipeline, one end of the fourth branch pipe is connected with the other three-way valve of the third pipeline, and the other end of the fourth branch pipe is connected with the other three-way valve of the fourth pipeline, so that the third branch pipe and the fourth branch pipe are arranged in parallel.

According to some embodiments of the disclosure, the multi-organ repairing and transferring device without interrupting blood flow further comprises a quick connector through which each of the three-way valves is connected with a respective one of the pipelines.

According to some embodiments of the disclosure, the multi-organ repairing and transferring device without interrupting blood flow further comprises a perfusion bin accommodating device, wherein the first perfusion bin, the second perfusion bin and the third perfusion bin are all arranged in the perfusion bin accommodating device.

According to some embodiments of the disclosure, a bottom portion of the first perfusion bin is provided with a first connector, a bottom portion of the second perfusion bin is provided with a second connector, a bottom portion of the third perfusion bin is provided with a third connector, the first connector protrudes downwardly from the bottom portion of the first perfusion bin, the first connector is provided with an upper opening and a lower opening, an area of the upper opening is larger than that of the lower opening, and structures of the second connector and the third connector are the same as that of the first connector.

According to some embodiments of the disclosure, the multi-organ repairing and transferring device without interrupting blood flow further comprises a heat exchange system, wherein the heat exchange system is capable of maintaining perfusion liquids in the first pipeline, the second pipeline, the third pipeline and the fourth pipeline at a set temperature.

According to some embodiments of the disclosure, the multi-organ repairing and transferring device without interrupting blood flow further comprises an adjusting pipeline, wherein the adjusting pipeline is capable of communicating the first perfusion bin, the second perfusion bin and the third perfusion bin, so as to adjust a liquid level among the first perfusion bin, the second perfusion bin and the third perfusion bin.

Additional aspects and advantages of the disclosure will be explained in part in the following description, which can become apparent from the following description or be understood through practice of the disclosure.

BRIEF DESCRIPTION OF THE DRAWINGS

The disclosure is further described hereinafter with reference to the drawings and the embodiments, wherein.

REFERENCE NUMERALS 110 refers to first perfusion bin, 111 refers to first connector, 112 refers to upper opening, 113 refers to lower opening, 120 refers to second perfusion bin, 130 refers to third perfusion bin, 210 refers to first pipeline, 220 refers to second pipeline, 230 refers to third pipeline, 240 refers to fourth pipeline, 250 refers to fifth pipeline, 260 refers to sixth pipeline, 310 refers to first pump, 320 refers to second pump, 330 refers to third pump, 340 refers to fourth pump, 410 refers to first branch pipe, 420 refers to second branch pipe, 430 refers to third branch pipe, 440 refers to fourth branch pipe, 500 refers to perfusion bin accommodating device, 600 refers to oxygenation mechanism, 700 refers to heat exchange system, 800 refers to liquid level adjusting pipeline, A refers to first liver, B refers to first kidney, and C refers to second kidney.

DETAILED DESCRIPTION

Embodiments of the disclosure are described below in detail, illustrations of which are shown in the drawings, where identical or similar reference numerals denote identical or similar elements or elements having the same or similar functions. The embodiments described below by reference to the drawings are exemplary and are intended only to explain the disclosure and are not to be construed as limiting the disclosure.

In the description of the disclosure, it should be understood that any orientation/position related description, such as the orientational or positional relationship, such as, up, down, front, rear, left, right, and the like, is based on the orientational or positional relationship shown in the drawings, is only for the purpose of facilitating the description of the disclosure and simplifying the description, and does not indicate or imply that the device or element must have a specific orientation or position, be constructed and operated in a specific orientation or position, and therefore shall not be understood as a limitation to the disclosure.

In the description of the disclosure, the term "several" refers to being one or more, the term "multiple" refers to being two or more, and the terms "greater than", "less than", "more than" and the like are understood as not including this number, while the terms "above", "below", "within" and the like are understood as including this number. If there are the descriptions of first and second, it is only for the purpose of distinguishing between technical features, and should not be understood as indicating or implying relative importance, implicitly indicating the number of the indicated technical features or implicitly indicating the order of the indicated technical features.

In the description of the disclosure, words such as arrangement, installation, and connection shall be understood in a broad sense unless otherwise expressly limited, and a person of ordinary skills in the art may reasonably determine the specific meaning of the above words in the disclosure with reference to the context of the technical scheme.

In the description of the disclosure, the descriptions of the reference terms "an embodiment", "some embodiments", "schematic embodiments", "examples", "specific examples", or "some examples" refer to that the specific features, structures, materials, or characteristics described in combination with the embodiment or example are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

Figure 1:
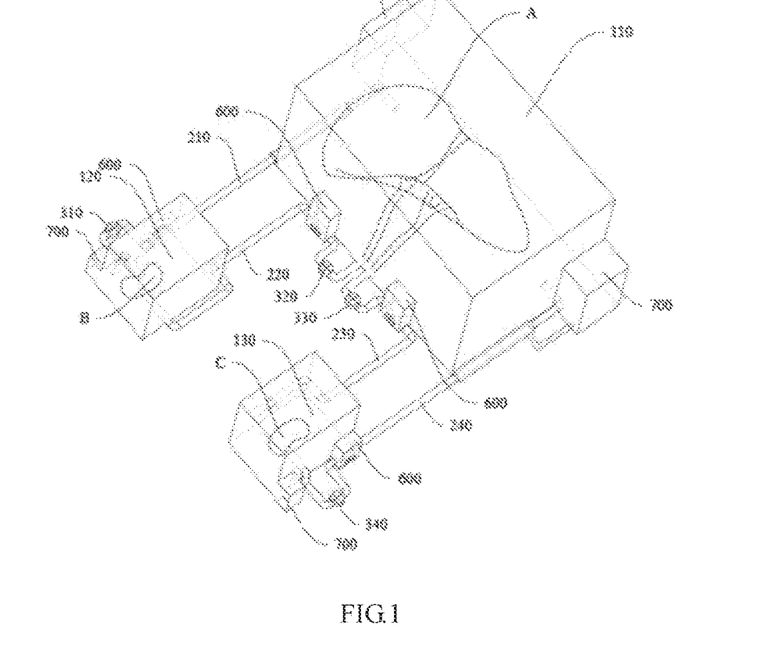
FIG. 1 is a schematic diagram of a multi-organ repairing and transferring device without interrupting blood flow according to an embodiment of the disclosure.
Figure 2:
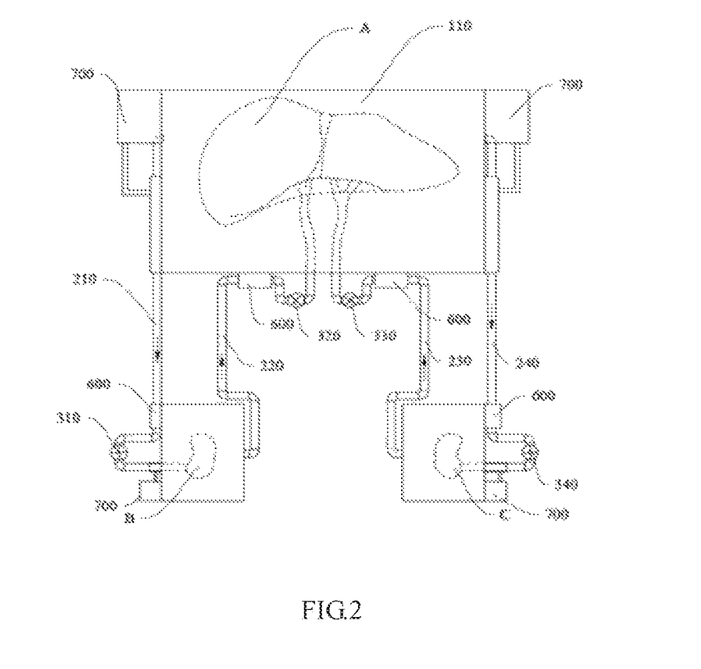
FIG. 2 is a top view of FIG. 1.

A multi-organ repairing and transferring device without interrupting blood flow according to an embodiment in a first aspect of the disclosure is described hereinafter with reference to FIG. 1 and FIG. 2, which comprises: a first perfusion bin 110 for storing a liver A, a second perfusion bin 120 for storing a first kidney B and a third perfusion bin 130 for storing a second kidney C. A first pump 310 is arranged on a first pipeline 210, one end of the first pipeline 210 is connected with the first perfusion bin 110, and the other end of the first pipeline 210 is connected with the second perfusion bin 120. A second pump 320 is arranged on a second pipeline 220, one end of the second pipeline 220 is connected with the first perfusion bin 110, and the other end of the second pipeline 220 is connected with the second perfusion bin 120. A third pump 330 is arranged on a third pipeline 230, one end of the third pipeline 230 is connected with the first perfusion bin 110, and the other end of the third pipeline 230 is connected with the third perfusion bin 130. A fourth pump 340 is arranged on a fourth pipeline 240, one end of the fourth pipeline 240 is connected with the first perfusion bin 110, and the other end of the fourth pipeline 240 is connected with the third perfusion bin 130.

Specifically, certain amounts of perfusion liquids are filled into the first perfusion bin 110, the second perfusion bin 120 and the third perfusion bin 130 in advance. After being isolated from a donor, the liver A is placed in the first perfusion bin 110, a hepatic artery of the liver A is connected with the second pipeline 220, a portal vein of the liver A is connected with the third pipeline 230, and a superior vena cava and an inferior vena cava of the liver A are in a free state in the first perfusion bin 110. After being isolated from a donor, the first kidney B is placed in the second perfusion bin 120, a renal artery of the first kidney B is connected with the first pipeline 210, and a vein of the first kidney B is in a free state in the second perfusion bin 120. After being isolated from a donor, the second kidney C is placed in the third perfusion bin 130, a renal artery of the second kidney C is connected with the fourth pipeline 240, and a vein of the second kidney C is in a free state in the third perfusion bin 130. After the connections above are established, the first pump 310, the second pump 320, the third pump 330 and the fourth pump 340 are turned on. The second pump 320 can be operated to perfuse the hepatic artery of the liver A through the second pipeline 220 with the perfusion liquid in the second perfusion bin 120, and the third pump 330 can be operated to perfuse the portal vein of the liver A through the third pipeline 230 with the perfusion liquid in the third perfusion bin 130. The perfusion liquid entering the liver A flows into the first perfusion bin 110 from the superior vena cava and the inferior vena cava of the liver A. The first pump 310 is operated to make the perfusion liquid in the first perfusion bin 110 enter the renal artery of the first kidney B through the first pipeline 210 while perfusing the liver A, thus perfusing the renal artery of the first kidney B, and the perfusion liquid entering the first kidney B flows into the second perfusion bin 120 from the renal vein of the first kidney B. The fourth pump 340 is operated to make the perfusion liquid in the first perfusion bin 110 enter the renal artery of the second kidney C through the fourth pipeline 240, thus perfusing the renal artery of the second kidney C, and the perfusion liquid entering the second kidney C flows into the third perfusion bin 130 from the renal vein of the second kidney C. The first pump 310, the second pump 320, the third pump 330 and the fourth pump 340 may be centrifugal pumps or other types of pumps. By the method above, according to the multi-organ repairing and transferring device without interrupting blood flow, the isolated liver and two kidneys can be perfused jointly, stability of electrolyte, urea, glucose and other components is maintained through the kidneys, and liver cells and biliary tracts are prevented from being damaged, so as to be able to repair the liver and two kidneys, so that the organs are closer to a perfusion state in the donors, thus effectively improving vitality of the liver and two kidneys. In addition, multi-organ transfer can be realized by the multi-organ repairing and transferring device without interrupting blood flow.

In order to improve oxyhemoglobin saturation of the perfusion liquid entering the liver and two kidneys, the first pipeline 210, the second pipeline 220, the third pipeline 230 and the fourth pipeline 240 are all provided with an oxygenation mechanism 600. When the oxyhemoglobin saturation of the perfusion liquid in the corresponding pipeline is lower than a set value, the oxygenation mechanism is turned on to make the oxyhemoglobin saturation of the perfusion liquid in the pipeline meet requirements, and then the liver and two kidneys are perfused.

Figure 3:
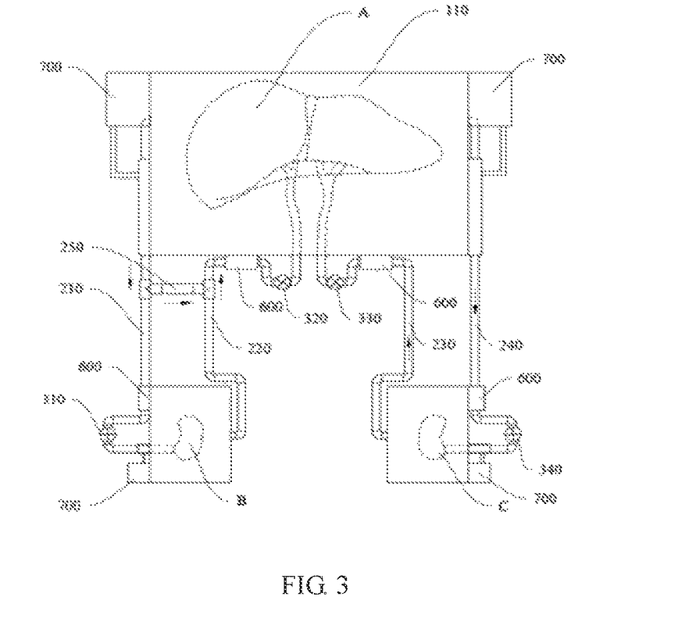
FIG. 3 is a top view of a multi-organ repairing and transferring device without interrupting blood flow according to another embodiment of the disclosure.

In some embodiments of the disclosure, as shown in FIG. 3, the multi-organ repairing and transferring device without interrupting blood flow further comprises a fifth pipeline 250, wherein one end of the fifth pipeline 250 is connected with the first pipeline 210 through one three-way valve, and the other end of the fifth pipeline 250 is connected with the second pipeline 220 through another three-way valve.

Specifically, FIG. 3 shows a connecting method between the fifth pipeline 250, and the first pipeline 210 and the second pipeline 220, wherein a left end of the fifth pipeline 250 is connected with the first pipeline 210 through one three-way valve, and a right end of the fifth pipeline 250 is connected with the second pipeline 220 through another three-way valve. When an upper end and a lower end of the three-way valve on a left side of the fifth pipeline are communicated, but the upper end and a right end of the three-way valve are not communicated, the first pipeline 210 is communicated, which means that the perfusion liquid in the first perfusion bin 110 is capable of being filled into the second perfusion bin 120 through the first pipeline 210. When an upper end and a lower end of the three-way valve on a right side of the fifth pipeline 250 are communicated, but the upper end and a left end of the three-way valve are not communicated, the second pipeline 220 is communicated, which means that the perfusion liquid in the second perfusion bin 120 is capable of being filled into the first perfusion bin 110 through the second pipeline 220. According to the multi-organ repairing and transferring device without interrupting blood flow, the liver and two kidneys can be jointly perfused, and a specific perfusion method is the same as that of the multi-organ repairing and transferring device without interrupting blood flow shown in FIG. 2, which will not be repeated herein.

When the upper end and the lower end of the three-way valve on the left side of the fifth pipeline 250 are not communicated, but the upper end and the right end of the three-way valve are communicated, and the upper end and the lower end of the three-way valve on the right side of the fifth pipeline 250 are not communicated, but the upper end and the left end of the three-way valve are communicated, the liver A and the second kidney C can be jointly perfused by the multi-organ repairing and transferring device without interrupting blood flow. Certain amounts of perfusion liquids are filled into the first perfusion bin 110 and the third perfusion bin 130 in advance. After being isolated from the donor, the liver A is placed in the first perfusion bin 110, the hepatic artery of the liver A is connected with the second pipeline 220, the portal vein of the liver A is connected with the third pipeline 230, and the superior vena cava and the inferior vena cava of the liver A are in a free state in the first perfusion bin 110. After being isolated from the donor, the kidney is placed in the third perfusion bin 130, the renal artery of the kidney is connected with the fourth pipeline 240, and the vein of the kidney is in a free state in the third perfusion bin 130. After the connections above are established, the second pump 320, the third pump 330 and the fourth pump 340 are turned on. The second pump 320 is operated to make the perfusion liquid in the first perfusion bin 110 flow out and pass through a part of the first pipeline 210, the fifth pipeline 250 and a part of the second pipeline 220 to perfuse the hepatic artery of the liver A. The third pump 330 is operated to perfuse the portal vein of the liver A through the third pipeline 230 with the perfusion liquid in the third perfusion bin 130. The fourth pump 340 is operated to perfuse the renal artery of the kidney through the fourth pipeline 240 with the perfusion liquid in the first perfusion bin 110. By the arrangement above, according to the multi-organ repairing and transferring device without interrupting blood flow, the liver and unilateral kidney can be perfused, repaired and transferred, thus improving an application range of the multi-organ repairing and transferring device without interrupting blood flow. It can be understood that the fifth pipeline 250 may be only arranged between the third pipeline 230 and the fourth pipeline 240, so that the first perfusion bin 110 and the second perfusion bin 120 may be configured for perfusing the liver and unilateral kidney, or the fifth pipeline 250 may be arranged between the first pipeline 210 and the second pipeline 220, and between the third pipeline 230 and the fourth pipeline 240.

Figure 4:
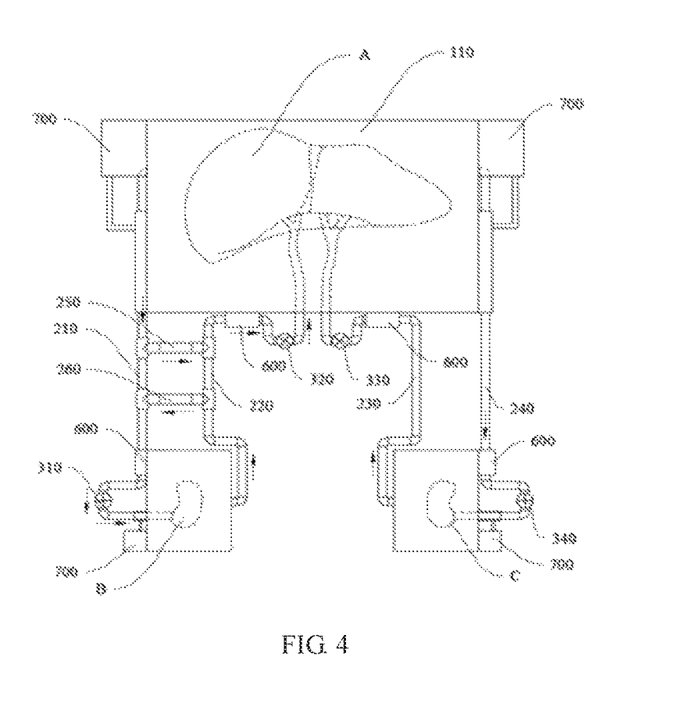
FIG. 4 is a top view of a multi-organ repairing and transferring device without interrupting blood flow according to another embodiment of the disclosure.

In some embodiments of the disclosure, as shown in FIG. 4, the multi-organ repairing and transferring device without interrupting blood flow further comprises a sixth pipeline 260, wherein one end of the sixth pipeline 260 is connected with the first pipeline 210 through one three-way valve, and the other end of the sixth pipeline 260 is connected with the second pipeline 220 through another three-way valve, so that the sixth pipeline 260 and the fifth pipeline 250 are arranged in parallel.

Specifically, a left end of the sixth pipeline 260 is connected with the first pipeline 210 through a three-way valve, a right end of the sixth pipeline 260 is connected with the second pipeline 220 through another three-way valve, and the sixth pipeline 260 and the fifth pipeline 250 are arranged in parallel. When upper and low ends of the three-way valves on two sides of the fifth pipeline and upper and low ends of the three-way valves on two sides of the sixth pipeline are all communicated, according to the multi-organ repairing and transferring device without interrupting blood flow, the liver and two kidneys can be jointly perfused, and the perfusion method is the same as that of the multi-organ repairing and transferring device without interrupting blood flow shown in FIG. 2.

Figure 6:
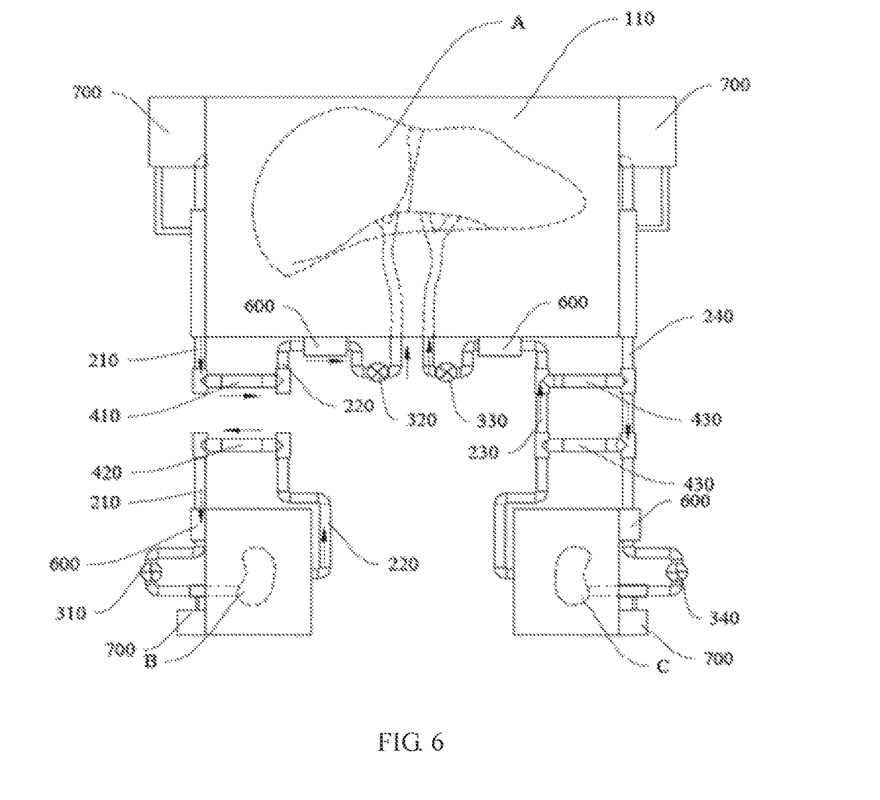
FIG. 6 is a schematic diagram of the device of FIG. 5 in a use state.

When an upper end and a lower end of the three-way valve on a left side of the fifth pipeline 250 are not communicated, but the upper end and a right end of the three-way valve are communicated, an upper end and a lower end of the three-way valve on a right side of the fifth pipeline 250 are not communicated, but the upper end and a left end of the three-way valve are communicated, an upper end and a lower end of the three-way valve on a left side of the sixth pipeline 260 are not communicated, but the lower end and a right end of the three-way valve are communicated, and an upper end and a lower end of the three-way valve on a right side of the sixth pipeline 260 are not communicated, but the lower end and a left end of the three-way valve are communicated, the liver and unilateral kidney can be jointly perfused and the unilateral kidney can be separately perfused by the multi-organ repairing and transferring device without interrupting blood flow. Specifically, as shown in FIG. 6, when the first pump 310 is operated, the perfusion liquid in the second perfusion bin 120 flows out from the second pipeline 220 and passes through the sixth pipeline 260 and the first pipeline 210 to perfuse the artery of the kidney (which is namely the first kidney B) in the second perfusion bin, which means that the unilateral kidney is separately perfused. The second pump 320 is operated to make the perfusion liquid in the first perfusion bin 110 flow out and pass through a part of the first pipeline 210, the fifth pipeline 250 and a part of the second pipeline 220 to perfuse the hepatic artery of the liver A, the third pump 330 is operated to perfuse the portal vein of the liver A through the third pipeline 230 with the perfusion liquid in the third perfusion bin 130, and the fourth pump 340 is operated to perfuse the renal artery of the second kidney C through the fourth pipeline 240 with the perfusion liquid in the first perfusion bin 110, which means that the liver and unilateral kidney are jointly perfused.

By the arrangement above, the multi-organ repairing and transferring device without interrupting blood flow has multiple perfusion modes to meet different use requirements.

Figure 5:
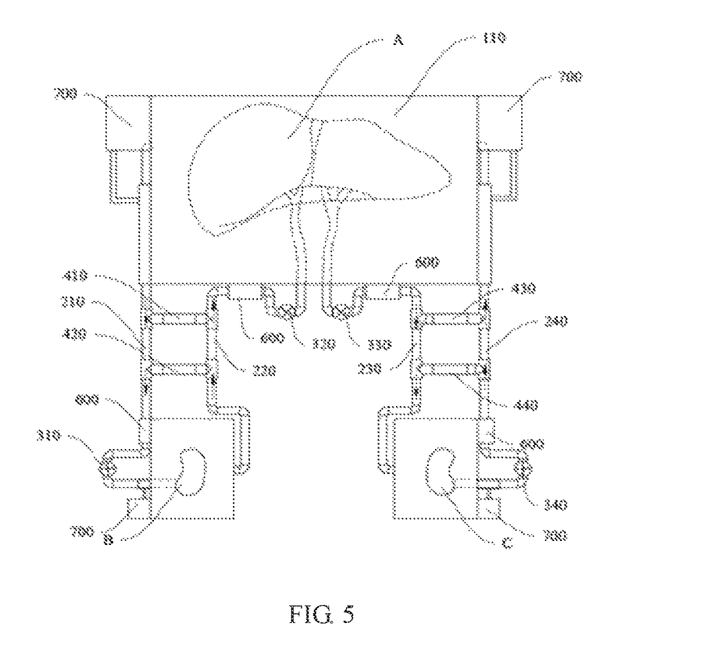
FIG. 5 is a top view of a multi-organ repairing and transferring device without interrupting blood flow according to another embodiment of the disclosure.

In some embodiments of the disclosure, as shown in FIG. 5, the multi-organ repairing and transferring device without interrupting blood flow further comprises a first branch pipe 410, a second branch pipe 420, a third branch pipe 430 and a fourth branch pipe 440. The first pipeline 210, the second pipeline 220, the third pipeline 230 and the fourth pipeline 240 are all provided with two three-way valves arranged at an interval. One end of the first branch pipe 410 is connected with one three-way valve of the first pipeline 210, the other end of the first branch pipe 410 is connected with one three-way valve of the second pipeline 220, one end of the second branch pipe 420 is connected with the other three-way valve of the first pipeline 210, and the other end of the second branch pipe 420 is connected with the other three-way valve of the second pipeline 220, so that the first branch pipe 410 and the second branch pipe 420 are arranged in parallel. One end of the third branch pipe 430 is connected with one three-way valve of the third pipeline 230, the other end of the third branch pipe 430 is connected with one three-way valve of the fourth pipeline 240, one end of the fourth branch pipe 440 is connected with the other three-way valve of the third pipeline 230, and the other end of the fourth branch pipe 440 is connected with the other three-way valve of the fourth pipeline 240, so that the third branch pipe 430 and the fourth branch pipe 440 are arranged in parallel. Specifically, two parallel branch pipes (the first branch pipe 410 and the second branch pipe 420) are arranged between the first pipeline 210 and the second pipeline 220, two parallel branch pipes (the third branch pipe 430 and the fourth branch pipe 440) are arranged between the third pipeline 230 and the fourth pipeline 240, and each branch pipe is connected with the corresponding pipeline through the three-way valve. When upper and lower ends of the three-way valves are all communicated, the first perfusion bin 110 and the second perfusion bin 120 are communicated through the first pipeline 210 and the second pipeline 220, and the first perfusion bin 110 and the third perfusion bin 130 are communicated through the first pipeline 210 and the third pipeline 230. At the moment, the liver and two kidneys can be jointly perfused and repaired by the multi-organ repairing and transferring device without interrupting blood flow, and the specific perfusion method is the same as that shown in FIG. 2, which will not be repeated herein.

An upper end and a lower end of the three-way valve on a left side of the first branch pipe 410 are not communicated, but the upper end and a right end of the three-way valve are communicated, an upper end and a lower end of the three-way valve on a right side of the first branch pipe 410 are not communicated, but the upper end and a left end of the three-way valve are communicated, an upper end and a lower end of the three-way valve on a left side of the second branch pipe 420 are not communicated, but the lower end and a right end of the three-way valve are communicated, an upper end and a lower end of the three-way valve on a right side of the second branch pipe 420 are not communicated, but the lower end and a left end of the three-way valve are communicated, and upper and lower ends of the connected three-way valves of the third branch pipe 430 and the fourth branch pipe 440 are all communicated. With the above arrangement, the specific perfusion method is shown in FIG. 6. When the first pump 310 is operated, the perfusion liquid in the second perfusion bin 120 flows out from the second pipeline 220 and passes through the second branch pipe 420 and the first pipeline 210 to perfuse the artery of the kidney (which is namely the first kidney B) in the second perfusion bin 120, which means that the kidney is separately perfused. The second pump 320 is operated to make the perfusion liquid in the first perfusion bin 110 flow out and pass through a part of the first pipeline 210, the first branch pipe 410 and a part of the second pipeline 220 to perfuse the hepatic artery of the liver A, the third pump 330 is operated to perfuse the portal vein of the liver A through the third pipeline 230 with the perfusion liquid in the third perfusion bin 130, and the fourth pump 340 is operated to perfuse the renal artery of the kidney (which is namely the second kidney C) through the fourth pipeline 240 with the perfusion liquid in the first perfusion bin 110, which means that the liver and unilateral kidney are jointly perfused.

Figure 7:
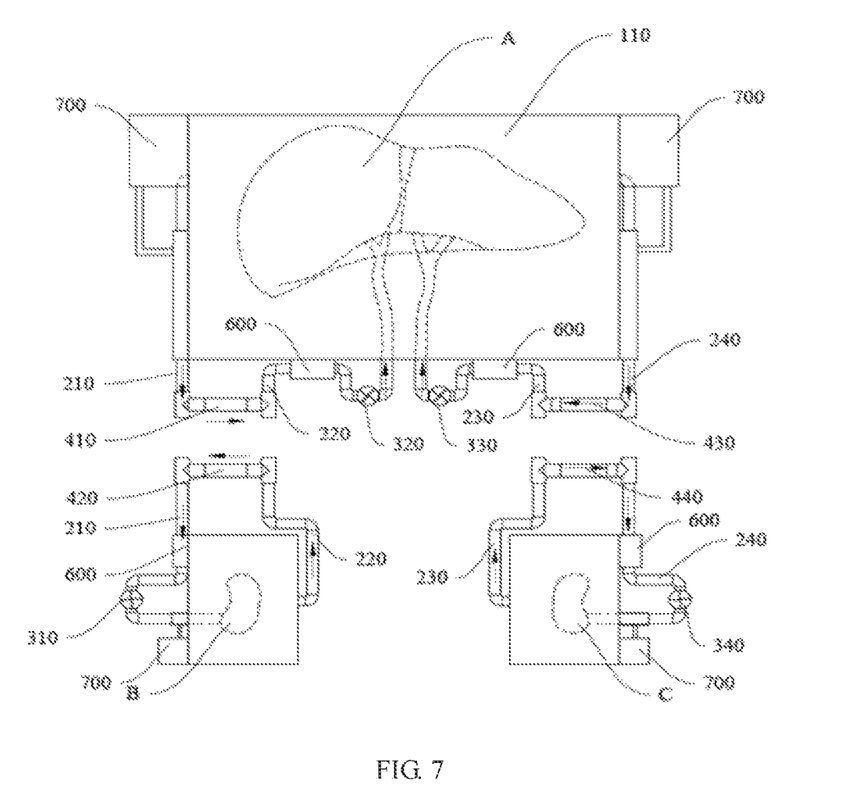
FIG. 7 is a schematic diagram of the device of FIG. 5 in another use state.

All the upper and lower ends of the connected three-way valves of the first branch pipe 410, the second branch pipe 420, the third branch pipe 430 and the fourth branch pipe 440 are not communicated, but the upper and right ends of the three-way valves on the left sides of the first branch pipe 410 and the third branch pipe 430 are communicated, the left and upper ends of the three-way valves on the right sides of the first branch pipe 410 and the third branch pipe 430 are communicated, the lower and right ends of the three-way valves on the left sides of the second branch pipe 420 and the fourth branch pipe 440 are communicated, and the lower and left ends of the three-way valves on the right sides of the second branch pipe 420 and the fourth branch pipe 440 are communicated. At the moment, all the first perfusion bin, the second perfusion bin and the third perfusion bin are not communicated, which means that the liver and kidney can be separately perfused by the multi-organ repairing and transferring device without interrupting blood flow. The specific perfusion method is shown in FIG. 7: The second pump 320 is operated to make the perfusion liquid in the first perfusion bin 110 pass through a part of the first pipeline 210, the first branch pipe 410 and a part of the second pipeline 220 to perfuse the hepatic artery of the liver A, the third pump 330 is operated to make the perfusion liquid in the first perfusion bin 110 pass through a part of the fourth pipeline 240, the third branch pipe 430 and a part of the third pipeline 230 to perfuse the portal vein of the liver A, and the perfusion liquids in the liver A flow out of the liver through the superior vena cava and the inferior vena cava of the liver A and are discharged into the first perfusion bin 110, thus separately perfusing the liver. The first pump 310 is operated to make the perfusion liquid in the second perfusion bin 120 pass through a part of the second pipeline 220, the second branch pipe 420 and a part of the first pipeline 210 to perfuse the renal artery of the kidney (the first kidney B), and the perfusion liquid in the kidney is discharged through the renal vein and flows into the second perfusion bin 120, thus separately perfusing the kidney (the first kidney B) in the second perfusion bin. The kidney in the third perfusion bin is also separately perfused by the same method, which will not be repeated herein. By the arrangement above, it can be switched to corresponding perfusion modes only by switching the three-way valves, which means that when one organ is transplanted, it can be switched to the corresponding mode, so that other organs can be perfused without interrupting blood flow, which can effectively avoid an ischemia injury to other corresponding organs when one organ is transplanted, thus improving capabilities of repairing and transferring the organs.

In practical application, the organs are usually transferred to different transplantation centers. In order to transfer the organs quickly, the three-way valve is connected with the corresponding pipeline through a quick connector. When the liver and two kidneys are obtained from the same donor, the liver and two kidneys are placed into the corresponding perfusion bins, and the liver and two kidneys are jointly perfused by the multi-organ repairing and transferring device without interrupting blood flow to repair the liver and two kidneys, and then the corresponding organs are transferred to the transplantation centers. When only one kidney needs to be transplanted, the three-way valve is disconnected from the corresponding pipeline, so that one kidney perfusion bin is separated from the other two perfusion bins. At the moment, the separated perfusion bin is capable of separately perfusing the kidney and the kidney can be separately transferred to the transplantation center for organ transplantation, while the other two perfusion bins are capable of jointly perfusing the liver and single kidney. When one of the two organs needs to be transplanted, the three-way valve is disconnected from the corresponding pipeline, and the corresponding perfusion bin is transferred to the transplantation center to transplant the organ in the perfusion bin. By the arrangement above, the organs in the same donor can be jointly repaired, and the corresponding modes can be switched according to actual use requirements, which can effectively avoid organ ischemia, thus improving repairing and transferring capabilities of the multi-organ repairing and transferring device without interrupting blood flow.

In some embodiments of the disclosure, the multi-organ repairing and transferring device without interrupting blood flow further comprises a perfusion bin accommodating device 500, wherein the first perfusion bin 110, the second perfusion bin 120 and the third perfusion bin 130 are all arranged in the perfusion bin accommodating device 500.

Figure 9:
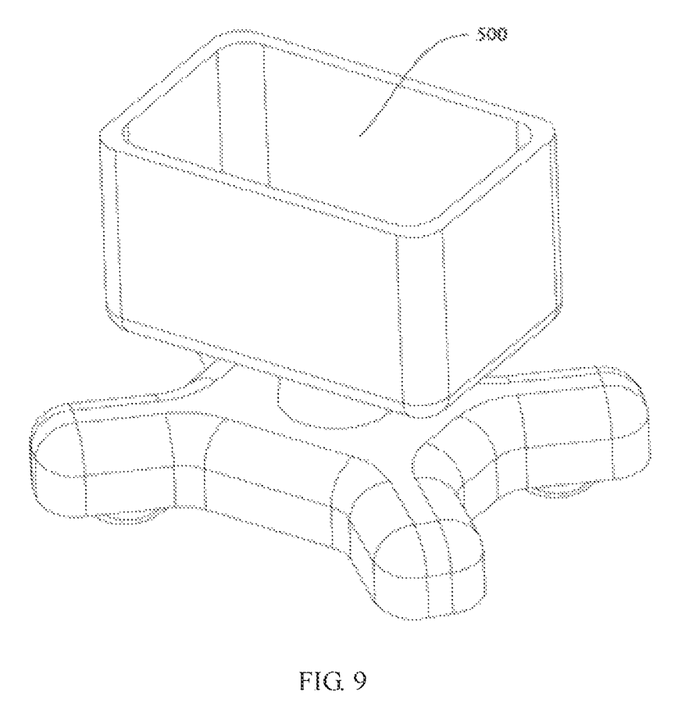
FIG. 9 is a schematic structural diagram of a perfusion bin accommodating device in the disclosure.

Specifically, the first perfusion bin 110, the second perfusion bin 120 and the third perfusion bin 130 are placed in the perfusion bin accommodating device 500. FIG. 9 shows a schematic structural diagram of the perfusion bin accommodating device 500, wherein moving rollers are arranged below the perfusion bin accommodating device 500. After the first perfusion bin 110, the second perfusion bin 120 and the third perfusion bin 130 are respectively placed in the perfusion bin accommodating device 500, the arrangement above can facilitate transferring through the moving rollers. In addition, in order to reduce shaking of the perfusion bins during transferring, a bottom portion of the perfusion bin accommodating device 500 is provided with a concave clamping groove, and a size of the concave clamping groove is matched with that of the corresponding perfusion bin.

In some embodiments of the disclosure, a bottom portion of the first perfusion bin 110 is provided with a first connector 111, a bottom portion of the second perfusion bin 120 is provided with a second connector, and a bottom portion of the third perfusion bin 130 is provided with a third connector. The first connector 111 protrudes downwardly from the bottom portion of the first perfusion bin 110, the first connector 111 is provided with an upper opening 112 and a lower opening 113, an area of the upper opening 112 is larger than that of the lower opening 113, and structures of the second connector and the third connector are the same as that of the first connector 111.

Figure 10:
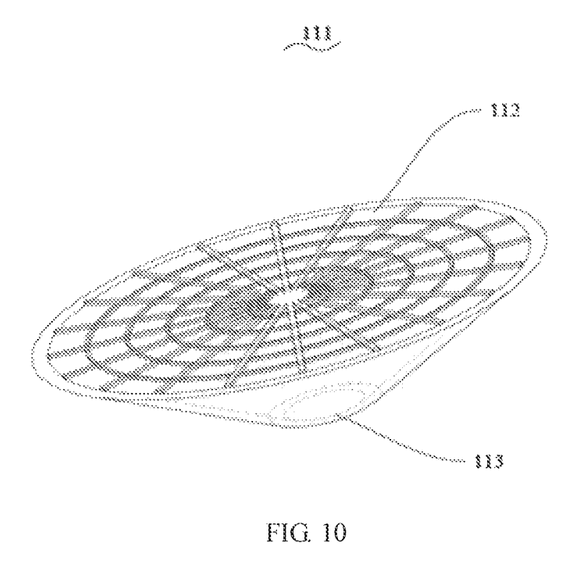
FIG. 10 is a schematic structural diagram of a first connector at a bottom portion of a first perfusion bin in the disclosure.

Specifically, the bottom portion of the first perfusion bin 110 is provided with the first connector 111. FIG. 10 shows a schematic structural diagram of the first connector 111, wherein the first connector 111 protrudes downwardly from the bottom portion of the first perfusion bin 110, the first connector 111 is provided with the upper opening 112 and the lower opening 113, and the area of the upper opening 112 is larger than that of the lower opening 113, which means that a funnel-shaped outlet is formed at the bottom portion of the first perfusion bin 110. A diameter of the upper opening of the first connector ranges from 5 cm to 10 cm, a diameter of the lower opening of the first connector ranges from 0.5 cm to 3 cm, and a depth of the first connector ranges from 1 cm to 3 cm (which is namely a height in an up-down direction). The bottom portion of the first perfusion bin may be provided with one first connector 111, and the first pipeline 210 and the fourth pipeline 240 are connected with the first connector 111 through the three-way valve. It can be understood that the bottom portion of the first perfusion bin 110 may also be provided with two first connectors 111, and the first pipeline 210 and the fourth pipeline 240 are each connected with a respective one of the first connectors 111. By the arrangement above, the first connector 111 is always located at a lowest position of the first perfusion bin 110, and even if there is a little perfusion liquid in the first perfusion bin, the first connector 111 can be fully filled with the perfusion liquid, which can effectively prevent gas from entering a perfusion circulation loop through the connector at the bottom portion. The upper opening of the first connector 111 has a grid-like structure as shown in FIG. 10, which can effectively prevent the liver A from falling into the first connector 111 to block the outlet. The bottom portion of the second perfusion bin 120 is provided with the second connector, and the second pipeline 220 is connected with the second connector. The bottom portion of the third perfusion bin 130 is provided with the third connector, and the third pipeline 230 is connected with the third connector. The second connector and the third connector both have the same structure as the first connector.

In some embodiments of the disclosure, the multi-organ repairing and transferring device without interrupting blood flow further comprises a heat exchange system 700, wherein the heat exchange system 700 is capable of maintaining perfusion liquids in the first pipeline 210, the second pipeline 220, the third pipeline 230 and the fourth pipeline 240 at a set temperature.

Specifically, a normal temperature of a human body is about 37° C. In order to improve performance of the multi-organ repairing and transferring device without interrupting blood flow, it is necessary to maintain the corresponding perfusion liquids at about 37° C. to achieve a better perfusion performance. In order to maintain a temperature of a perfusion liquid in the perfusion loop within a set range, the heat exchange system 700 is arranged outside the first perfusion bin 110, the second perfusion bin 120 and the third perfusion bin 130. The heat exchange system is a water heat exchange system, the first pipeline 210, the second pipeline 220, the third pipeline 230 and the fourth pipeline 240 are all arranged in the water heat exchange system, and the perfusion liquids in the pipelines exchange heat with the water heat exchange system, so as to maintain the perfusion liquid in the circulation loop at the set temperature.

In some embodiments of the disclosure, the multi-organ repairing and transferring device without interrupting blood flow further comprises an adjusting pipeline 800, wherein the adjusting pipeline 800 is capable of communicating the first perfusion bin 110, the second perfusion bin 120 and the third perfusion bin 130, so as to adjust a liquid level among the first perfusion bin 110, the second perfusion bin 120 and the third perfusion bin 130.

Figure 8:
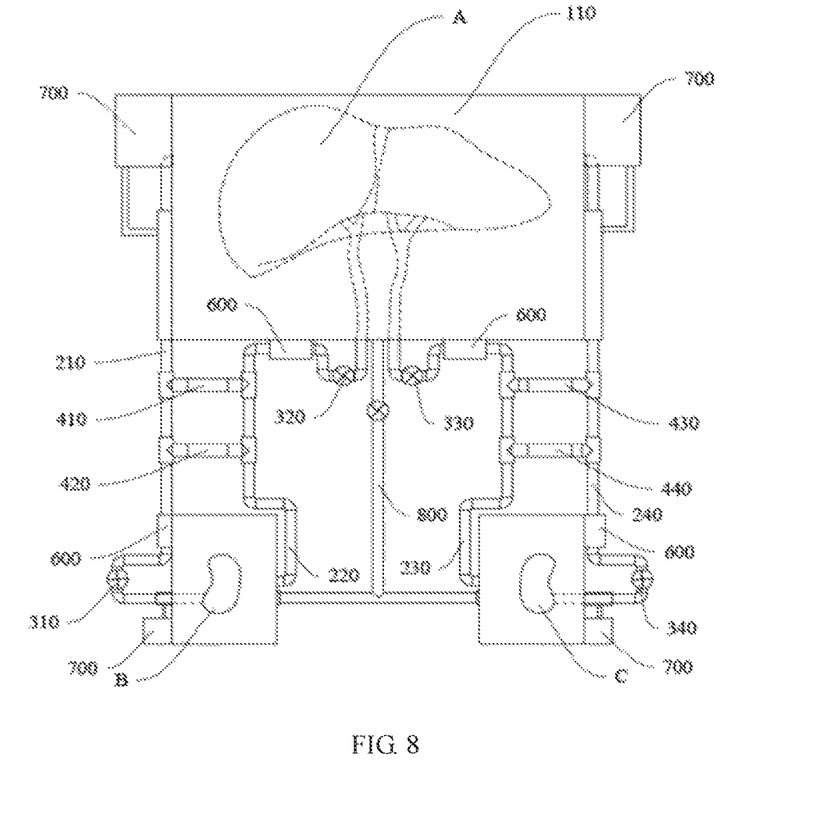
FIG. 8 is a top view of a multi-organ repairing and transferring device without interrupting blood flow according to another embodiment of the disclosure.

Specifically, in a normal human body, main blood supply vessels of the liver are the hepatic artery and the portal vein, a blood flow volume of the hepatic artery is about 350 ml/min, and a blood flow volume of the portal vein is about 1,100 ml/min. A main blood supply vessel of the kidney is the renal artery, and a blood flow volume of the renal artery of the unilateral kidney is about 600 ml/min. Therefore, when the liver and two kidneys are perfused by the multi-organ repairing and transferring device without interrupting blood flow, the liver and kidneys are also perfused according to normal perfusion flow volumes of a human body. However, due to that the liver and kidneys have different flow volume requirements, liquid levels of the perfusion bins may change greatly after continuous perfusion for a period of time. By arranging the adjusting pipeline 800 between the first perfusion bin 110, the second perfusion bin 120 and the third perfusion bin 130, as shown in FIG. 8, when a liquid level of one of the perfusion bins is lower than a low liquid location, the perfusion liquid in one of the other two perfusion bins with a higher liquid level is preferentially delivered to the perfusion bin to maintain a liquid level balance among the perfusion bins. By the arrangement above, it is beneficial for maintaining the isolated organs for a long time by the multi-organ repairing and transferring device without interrupting blood flow, thus reducing a problem of organ quality degradation caused by long-time organ isolation.

A perfusion method according to an embodiment in a second aspect of the disclosure is described hereinafter. The perfusion method employs the multi-organ repairing and transferring device without interrupting blood flow according to the embodiment in the first aspect of the disclosure, and comprises the following steps.

The perfusion liquid is prepared: concentrated red blood cells of the same blood type as the isolated organs are diluted to an appropriate proportion, and the perfusion liquid is filled into the first perfusion bin 110, the second perfusion bin 120 and the third perfusion bin 130.

The isolated liver is acquired, then the isolated liver is placed in the first perfusion bin 110, the hepatic artery of the isolated liver is communicated with the second pipeline 220, and the portal vein of the isolated liver is communicated with the third pipeline 230. The first isolated kidney is acquired, then the first isolated kidney is placed in the second perfusion bin 120, and the renal artery of the first isolated kidney is communicated with the first pipeline 210. The second isolated kidney is acquired, then the second isolated kidney is placed in the third perfusion bin 130, and the renal artery of the second isolated kidney is communicated with the fourth pipeline 240. The perfusion device is turned on.

The multi-organ repairing and transferring device without interrupting blood flow is configured to be in a first perfusion mode, so as to jointly perfuse the liver and two kidneys by the multi-organ repairing and transferring device without interrupting blood flow; or the multi-organ repairing and transferring device without interrupting blood flow is configured to be in a second perfusion mode, so as to separately perfuse the liver and kidneys by the multi-organ repairing and transferring device without interrupting blood flow; or the multi-organ repairing and transferring device without interrupting blood flow is configured to be in a third perfusion mode, so as to jointly perfuse the liver and one kidney and separately perfuse the other kidney by the multi-organ repairing and transferring device without interrupting blood flow.

Specifically, the concentrated red blood cells of the same blood type as the isolated organs are diluted to the appropriate proportion, and the perfusion liquid is filled into the first perfusion bin, the second perfusion bin and the third perfusion bin. The perfusion liquid is prepared by simulating components of blood. The main component is the red blood cells of the same type as the isolatedly preserved organs. By using an oxygen-carrying function of the red blood cells, oxygenation is carried out by an oxygenation mechanism to supply oxygen to the isolated organs. Other components of the perfusion liquid are used for maintaining a blood environment suitable for survival of the red blood cells, and mainly comprise colloid fluid, sodium, calcium and magnesium plasmas, antibiotics, hormones, trace elements, amino acids, alkalies, heparin and so on. During preparation, the concentrated red blood cells of the same blood type as the isolated organs are diluted to the appropriate proportion to ensure that the red blood cells are neither subjected to edema nor subjected to dehydration.

Before the isolated organs are placed into the perfusion bins, the multi-organ repairing and transferring device without interrupting blood flow is idled in the first perfusion mode and the second perfusion mode respectively, so as to completely discharge gas in the circulation loop. During idling, the first connector, the second connector and the third connector should all be fully filled with the perfusion liquid, which can also prevent the gas from passing through the bottom portions of the perfusion bins to enter the perfusion circulation loop.

The organs are acquired and loaded. During acquisition of the liver of the donor, a fine operation is carried out to isolate the liver from the donor, the portal vein, the hepatic artery, the bile duct, the superior vena cava and the inferior vena cava are clearly separated, the liver is quickly placed in the first perfusion bin 110 after blocking blood flow, the hepatic artery of the liver is connected with the second pipeline 220, and the portal vein of the liver is connected with the third pipeline 230. During acquisition of the kidneys of the donor, the renal artery, the renal vein and the ureter of one kidney are clearly separated, the kidney is quickly placed in the second perfusion bin 120 after blocking blood flow, and the renal artery of the kidney is connected with the first pipeline 210, and then the renal artery, the renal vein and the ureter of the other kidney are clearly separated, the kidney is quickly placed in the third perfusion bin 130 after blocking blood flow, and the renal artery of the kidney is connected with the fourth pipeline 240. After the organs are placed in the corresponding perfusion bins and communicated with the corresponding pipelines, the perfusion system is quickly turned on. At the moment, the multiple organs are perfused and repaired by the multi-organ repairing and transferring device without interrupting blood flow.

In clinical practice, the liver and bilateral kidneys of the same donor may be assigned to different transplantation centers. Based on this situation, the multi-organ repairing and transferring device without interrupting blood flow has the first perfusion mode, the second perfusion mode or the third perfusion mode. In the first perfusion mode, the liver and two kidneys can be jointly perfused by the device (as shown in FIG. 5), in the second perfusion mode, the liver and two kidneys can be separately perfused by the device (as shown in FIG. 7), and in the third perfusion mode, the liver and one kidney can be jointly perfused and the other kidney can be separately perfused by the device (as shown in FIG. 6.) The liver and kidneys of the same donor are repaired in the first perfusion mode. After finishing repairing, according to organ requirements of the transplantation centers, the device is switched to the second perfusion mode, and the corresponding pipelines are separated to disconnect the pipelines among the first perfusion bin, the second perfusion bin and the third perfusion bin, or the device is switched to the third perfusion mode to make one of the kidney perfusion bins independent, so as to transfer the required organs to the transplantation centers. During transferring, all the isolated organs are capable of being kept in a perfusion state all the time, thus avoiding organ ischemia.

In order to make organ perfusion of the multi-organ repairing and transferring device without interrupting blood flow closer to that of the donor, and the device is also provided with a control center, a pressure monitoring device, a flow rate monitoring device and a temperature monitoring device. The pressure monitoring device, the flow rate monitoring device and the temperature monitoring device are arranged at a filling port and a refluxing port of the pipeline for monitoring a pressure, a flow rate and a temperature of the perfusion liquid in the circulation loop. The control center receives signals from the pressure monitoring device, the flow rate monitoring device and the temperature monitoring device, and the control center controls the first pump, the second pump, the third pump, the fourth pump and the heat exchange system to work, so as to achieve the purpose of real-time control and adjustment of perfusion parameters.

The embodiments of the disclosure are described in detail with reference to the drawings above, but the disclosure is not limited to the above embodiments, and various changes may also be made within the knowledge scope of those of ordinary skills in the art without departing from the purpose of the disclosure. In addition, the embodiments of the disclosure and the features in the embodiments may be combined with each other to derive other embodiments not explicitly described herein.

The invention claimed is:

1. A multi-organ repairing and transferring device without interrupting blood flow, comprising:
   a first perfusion bin for storing a liver;
   a second perfusion bin for storing a first kidney;
   a third perfusion bin for storing a second kidney;
   a first pipeline and a first pump, wherein the first pump is arranged on the first pipeline, one end of the first pipeline is connected with the first perfusion bin, and the other end of the first pipeline is connected with the second perfusion bin;
   a second pipeline and a second pump, wherein the second pump is arranged on the second pipeline, one end of the second pipeline is connected with the first perfusion bin, and the other end of the second pipeline is connected with the second perfusion bin;
   a third pipeline and a third pump, wherein the third pump is arranged on the third pipeline, one end of the third pipeline is connected with the first perfusion bin, and the other end of the third pipeline is connected with the third perfusion bin; and
   a fourth pipeline and a fourth pump, wherein the fourth pump is arranged on the fourth pipeline, one end of the fourth pipeline is connected with the first perfusion bin, and the other end of the fourth pipeline is connected with the third perfusion bin.

2. The multi-organ repairing and transferring device without interrupting blood flow according to claim 1, further comprising a fifth pipeline, wherein one end of the fifth pipeline is connected with the first pipeline through one three-way valve, and the other end of the fifth pipeline is connected with the second pipeline through another three-way valve.

3. The multi-organ repairing and transferring device without interrupting blood flow according to claim 2, further comprising a sixth pipeline, wherein one end of the sixth pipeline is connected with the first pipeline through one three-way valve, and the other end of the sixth pipeline is connected with the second pipeline through another three-way valve, so that the sixth pipeline and the fifth pipeline are arranged in parallel.

4. The multi-organ repairing and transferring device without interrupting blood flow according to claim 1, further comprising a first branch pipe, a second branch pipe, a third branch pipe and a fourth branch pipe, wherein the first pipeline, the second pipeline, the third pipeline and the fourth pipeline are all provided with two three-way valves arranged at an interval, one end of the first branch pipe is connected with one three-way valve of the first pipeline, the other end of the first branch pipe is connected with one three-way valve of the second pipeline, one end of the second branch pipe is connected with the other three-way valve of the first pipeline, and the other end of the second branch pipe is connected with the other three-way valve of the second pipeline, so that the first branch pipe and the second branch pipe are arranged in parallel; and
   one end of the third branch pipe is connected with one three-way valve of the third pipeline, the other end of the third branch pipe is connected with one three-way valve of the fourth pipeline, one end of the fourth branch pipe is connected with the other three-way valve of the third pipeline, and the other end of the fourth branch pipe is connected with the other three-way valve of the fourth pipeline, so that the third branch pipe and the fourth branch pipe are arranged in parallel.

5. The multi-organ repairing and transferring device without interrupting blood flow according to claim 4, further comprising a quick connector, through which each of the three-way valves is connected with a respective one of the pipelines.

6. The multi-organ repairing and transferring device without interrupting blood flow according to claim 1, further comprising a perfusion bin accommodating device, wherein the first perfusion bin, the second perfusion bin and the third perfusion bin are all arranged in the perfusion bin accommodating device.

7. The multi-organ repairing and transferring device without interrupting blood flow according to claim 1, wherein a bottom portion of the first perfusion bin is provided with a first connector, a bottom portion of the second perfusion bin is provided with a second connector, a bottom portion of the third perfusion bin is provided with a third connector, the first connector protrudes downwardly from the bottom portion of the first perfusion bin, the first connector is provided with an upper opening and a lower opening, an area of the upper opening is larger than an area of the lower opening, and structures of the second connector and the third connector are the same as a structure of the first connector.

8. The multi-organ repairing and transferring device without interrupting blood flow according to claim 1, further comprising an adjusting pipeline communicating the first perfusion bin, the second perfusion bin and the third perfusion bin, so as to adjust a liquid level among the first perfusion bin, the second perfusion bin and the third perfusion bin.

* * * * *